United States Patent [19]

Ikemori

[11] 4,390,248
[45] Jun. 28, 1983

[54] WIDE ANGLE ZOOM LENS

[75] Inventor: Keiji Ikemori, Yokohama, Japan

[73] Assignee: Canon Kabushiki Kaisha, Tokyo, Japan

[21] Appl. No.: 188,560

[22] Filed: Sep. 18, 1980

[30] Foreign Application Priority Data

Sep. 27, 1979 [JP] Japan ............................. 54-124544
Dec. 7, 1979 [JP] Japan ............................. 54-158950

[51] Int. Cl.³ .................................... G02B 15/18
[52] U.S. Cl. ................................ 350/427; 350/428
[58] Field of Search ............................... 350/427, 428

[56] References Cited

U.S. PATENT DOCUMENTS 3,609,005 9/1971 Nakamura ........................ 350/427
4,050,788 11/1975 Wendisch ......................... 350/427

*Primary Examiner*—John K. Corbin
*Assistant Examiner*—Paul M. Dzierzynski
*Attorney, Agent, or Firm*—Toren, McGeady and Stanger

[57] ABSTRACT

In the wide angle zoom lens disclosed, a first lens group of positive refractive power is stationary during zooming, but movable for focusing and consists of four elements forming three members, namely from front to rear, a cemented lens and two positive lenses, all three in meniscus form with convex curvature toward the front, and with the cemented lens being almost afocal with its cemented surface divergent and convex toward the front. A second lens group of negative refractive power is movable for changing the magnification and consists of four elements, namely, from front to rear, two negative meniscus lenses of forward convixity, a bi-concave negative lens and a positive lens, with the bi-concave negative lens and the positive lens defining an air space having a converging effect. A third lens group is movable for maintaining a constant image plane as the second group moves to effect a change in magnification, and a fourth lens group positioned in the rear of the third group is stationary during zooming.

5 Claims, 39 Drawing Figures

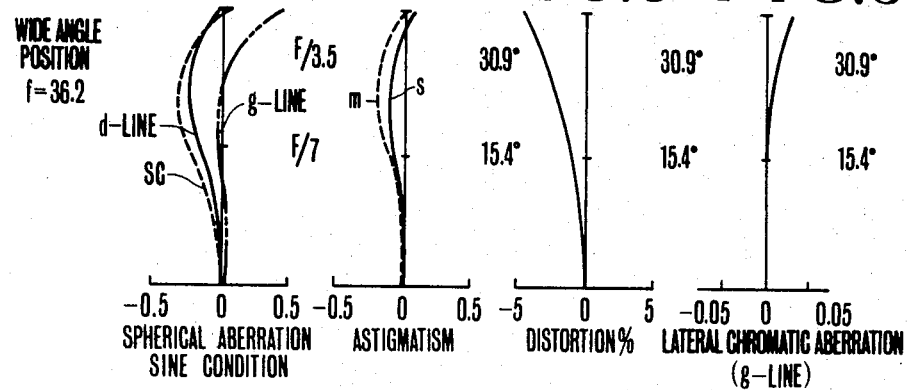
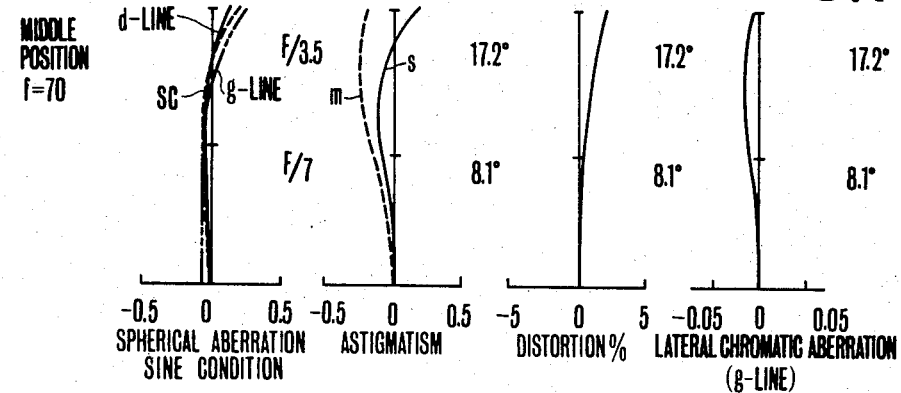
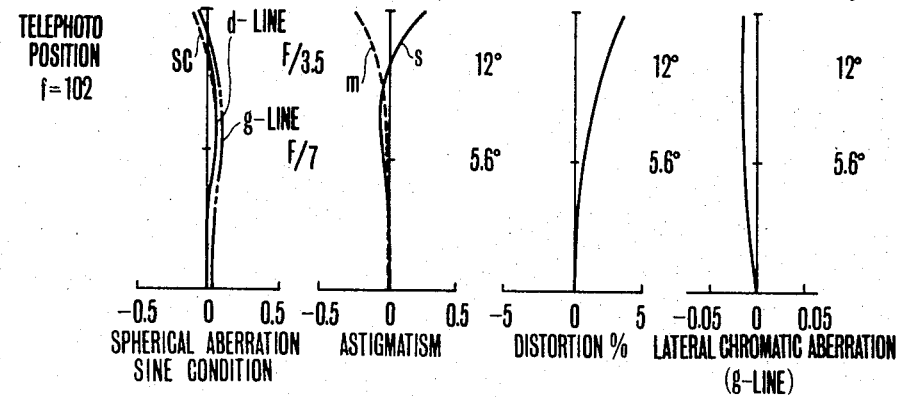

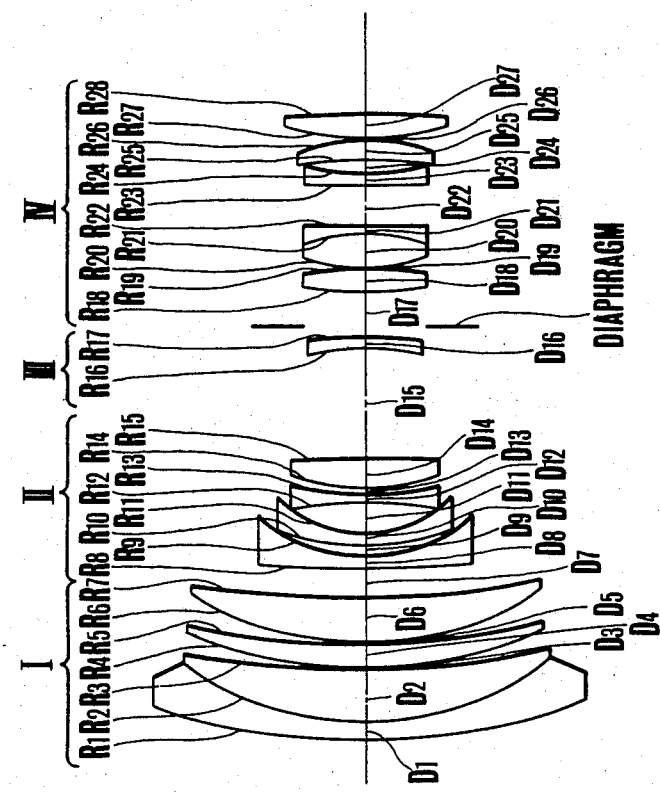

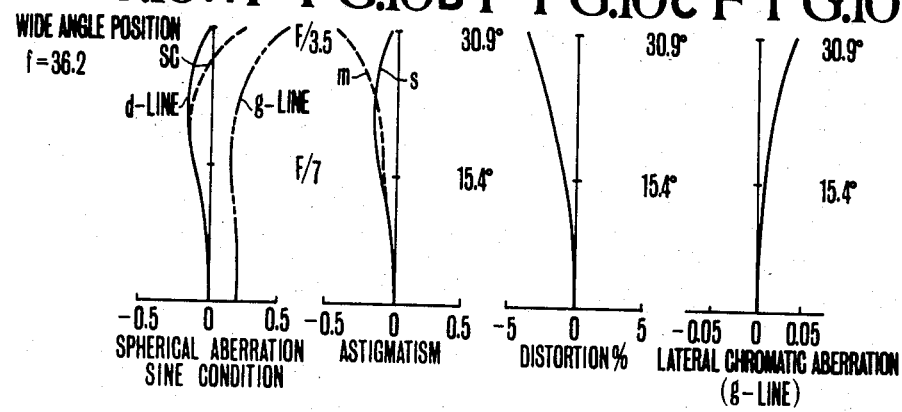
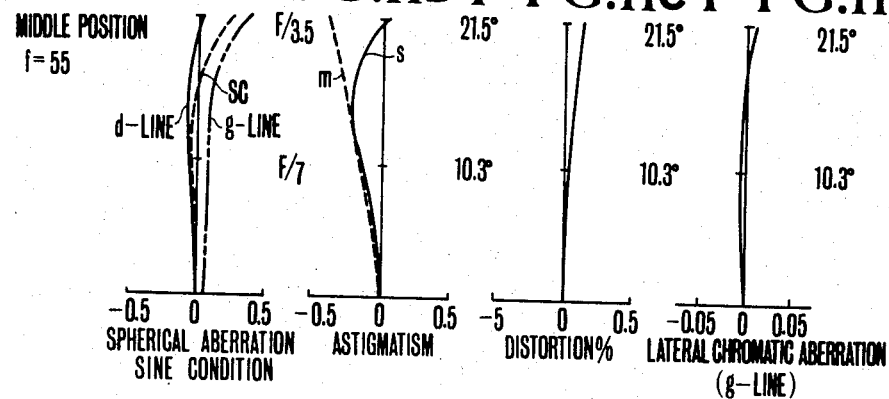
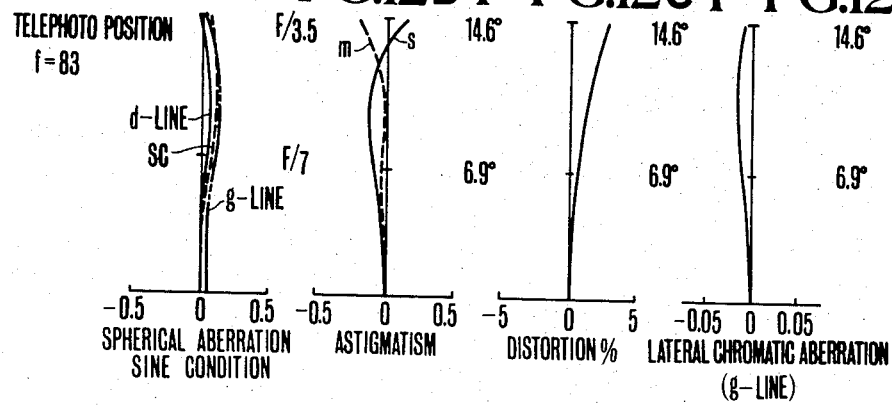

WIDE ANGLE ZOOM LENS

BACKGROUND OF THE INVENTION

1. Field of the Invention

This invention relates to four-component wide angle zoom lenses, particularly of the type whose shortest focal lengths are shorter than the length of the diagonal of the image size, which exhibit a zoom ratio larger than 2.5, and which start with a convergent lens group.

2. Description of the Prior Art

A wide variety of zoom lenses of the convergent component-preceded four-component type are known. They are shown, for example, in Austrian patent specifications filed Nov. 18, 1974 Application No. A9242/74, and filed Aug. 11, 1975, Application No. A6230/75, Japanese Pat. Publication Nos. Sho 53-9095 and Sho 40-13314, and Japanese Laid-Open Pat. Nos. Sho 52-104137 and Sho 52-69640.

With such convergent component-preceded four-component zoom lenses, achieving compactness requires avoiding a large increase in the diameter of the front component by making the focal length of each of the zoom components as small as possible. However, as the focal length of each of the zoom components is reduced, zooming causes variations of the aberrations and, in particular, makes distortion, astigmatism, and aspherical aberration very prominent. Thus, it is difficult to obtain a properly corrected wide angle zoom lens of this type. Also, though a divergent component-preceded or so-called two-component zoom arrangement is generally more advantageous than a convergent component-preceded four-component zoom type for correcting aberrations in the wide angle positions and shortening the diameter of the front members, when the zoom ratio is increased to as high as 2.5 or more, it becomes very difficult to obtain good aberration correction stability in the telephoto position and to achieve a large increase in the relative aperture.

SUMMARY OF THE INVENTION

An object of the present invention is to improve zoom lenses of this type.

Another object of the invention is to avoid the aforementioned difficulties.

Still another object of the invention is to provide a zoom lens of the convergent component-precedent four-component type with a zoom ratio of more than 2.5, while still preserving high grade imagery even in the wide angle position.

It is another object of this invention to offer the good stability of correction of astigmatism and distortion which was thought to be very difficult to achieve in the prior art.

The present invention furnishes embodiment of a wide angle zoom lens having a zoom ratio of the order 2.8 capable of maintaining high grade imagery in the telephoto positions, affording a constant high relative aperture of 1:3.5 throughout the entire zooming range, and permitting the lens system to be compact.

BRIEF DESCRIPTION OF THE DRAWINGS

FIGS. 6, 7 and 8 are graphic representations of the various aberrations of the lens of FIG. 5 when in the wide angle, middle and telephoto positions with object at infinity.

FIG. 9 is a lens block diagram corresponding to Example 3.

FIGS. 10, 11 and 12 are graphic representations of the various aberrations of the lens of FIG. 9 when in the wide angle, middle and telephoto positions with object at infinity.

DETAILED DESCRIPTION OF THE PREFERRED EMBODIMENTS

Figure 1:
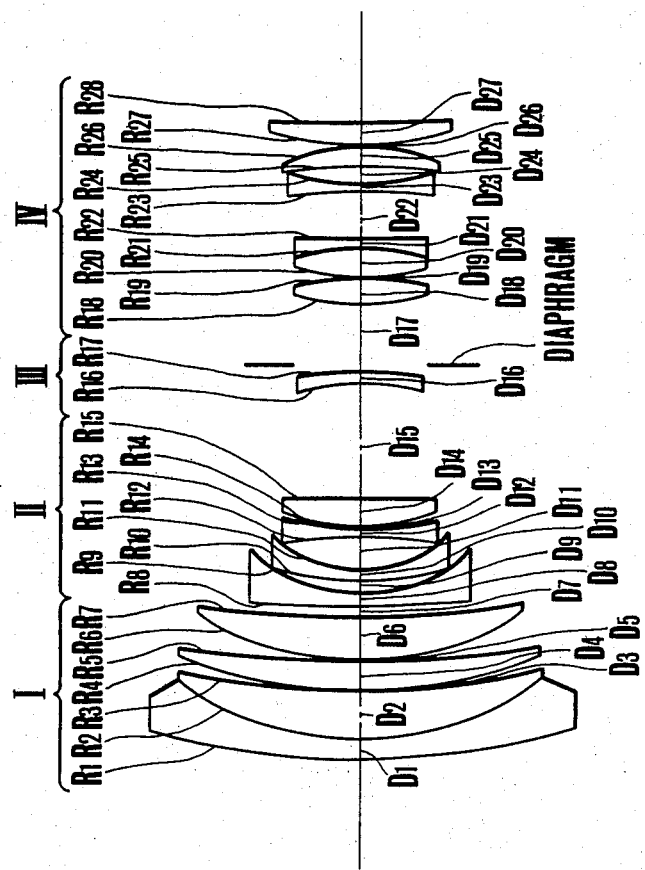
FIG. 1 is a lens block diagram corresponding to Example 1 of a specific zoom lens according to the present invention.

An example of a specific wide angle zoom lens embodying the present invention includes from front to rear, a convergent first lens component axially which is movable for focusing but remains stationary during zooming, a divergent second lens component axially movable with zooming to effect a change in magnification of the object, and a 3rd lens component movable for maintaining a constant image plane as the 2nd component moves, followed in rear thereof by a 4th lens component which remains stationary during zooming. The convergent first component consists of four elements forming three members of which the first counting from the front is a cemented lens and the other two are positive lenses. All of these three members each assume the meniscus form of convex curvature toward the front, and the cemented lens is an afocal lens with its cemented surface convex toward the front in diverging action. The divergent second component consists of four elements of which the first two are negative meniscus lenses of forward convexity, the third is a bi-concave or negative lens, and the fourth is a positive lens, with an air space defined by the last two elements having a converging action.

An advantage derived from such construction of the convergent first component is that a further minimization of the diameter of the front members is facilitated and solution of the aberrational problems is made feasible. Another advantage is derived from the configuration of all the members in the first component to the meniscus shape of forward convexity and that the frontmost one of the members in the first component, or the cemented lens of a largest diameter has a power (reciprocal of the focal length) lying between $-0.06/fw$ and $0.03/fw$ where $fw$ represents the shortest focal length of entire lens system, in other words, is made almost afocal with such a structure, when the lens is in the wide angle positions the oblique pencil of light rays at the largest angles of view is hardly refracted in passing therethrough and is subjected to a first substantial refraction by the following positive lens of a relatively small diameter. The resulting advantage is that the diameter of the front member can be prevented from increasing, and the aberrational problem can be handled simply, as no extremely large aberrations of higher order (particularly distortion and astigmatism) are produced.

Another advantage arising from the construction of the afocal lens in the cemented form is that since the cemented surface with its diverging action removes the spherical aberration and chromatic aberration which would be otherwise caused by the first component, and thus, there is not need to construct the other positive lenses in the cemented form, the axial thicknesses may be thin, thus contributing to a reduction of the total length of the entire lens system. Further since, as the front cemented lens is afocal, the marginal thickness of the lens is not much different from the axial thickness, the curvature of the cemented surface can be strengthened without the necessity of so much increase in thickness. This affords the advantage that the spherical aberration and chromatic aberration ascribable particularly to the 1st component can be very well corrected in the telephoto positions, and good stability of aberration correction can be maintained in the focusing range too. Now, when the power of the cemented lens $1/f_1$ where $f_1$ represents the focal length of the cemented lens is smaller than $-0.06/fw$, because of the 1st component having the positive power, the powers of the other two positive lenses become too strong and their diameters also tend to increase, thus causing these two positive lenses to produce higher order aberrations in the wide angle positions which cannot be corrected without difficulties, and giving an additional disadvantage that the total length of the entire lens system is unavoidably increased. Conversely when it is larger than $0.03/fw$, higher order aberrations are produced by this cemented lens in the wide angle positions, and the diameter of the front member is increased.

Still another feature is that all the members constituting the 1st component are configured to the meniscus shape of forward convexity. Otherwise, the oblique pencil at the largest angles of view in the wide angle positions would be acutely refracted by the rear surface of each of the members with the production of higher aberrations. Particularly regarding the cemented lens of large diameter, it is preferred that its rear surface has a radius of curvature $R_3$ lying between 3 fw and 5 fw. When the $R_3$ is smaller than 3 fw, the curvature of this surface becomes too strong to limit the range of variation of spherical aberration with focusing to an acceptable level when the zoom lens is set in the telephoto position. When larger that 5 fw, on the other hand, higher aberrations are caused to produce by this surface in the wide angle positions so that a simple treatment of aberration correction becomes impossible.

Next, with the divergent 2nd lens component of such construction, the arrangement of the positive element behind the three negative elements brings out the front principal point of the 2nd component to the neighbourhood of the first surface thereof so that the 1st and 2nd components can be spaced from each other with the interval between the principal points thereof made minimized without causing a mechanical interference therebetween when in wide angle settings. This is very advantageous in reducing the diameter of the front member. Another advantage deriving from the configuration of the first two negative elements to the meniscus shape of forward convexity is that as the oblique pencil of the largest angular field in the wide angle position leaves from the convergent 1st component at a large angle with the optical axis, this angle is made gradually smaller by these two negative lenses so that higher aberrations are not so much produced by this portion, and in particular the distortion and astigmatism can be corrected without the difficulty when the zoom lens is set in the wide angle position. Further, the provision of three negative elements in the 2nd component enables the spherical aberration of the 2nd component which tends to be over-corrected in the telephoto positions to be minimized by distribution over all these elements.

The above-described over-corrected spherical aberration can be very well compensated for by imparting a converging action into the air lens defined by the third negative element and the following positive element. Such characteristic of the 2nd component cooperates with that of the 1st component to enable the residual aberrations to be maintained stable throughout the zooming range.

As far as is known, there exists a similar example of the 2nd component as comprising, from front to rear, three negative elements and one positive element, but the last negative element and the positive element being cemented to each other. In so far as the above-described features and those to be described later, the examples of lenses of the present invention fundamentally differ from the conventional ones. Taking an example of the conventional zoom lens as described in Japanese Patent Publication No. Sho 45-8840, the following table shows numerical values for $f_2$: the focal length of the 2nd component; $f_{21}$, $f_{22}$ and $f_{23}$: the focal lengths of the 1st, 2nd and 3rd negative elements counting from the front respectively; and $O_1$: the distance from the first surface of the 2nd component to the front principal point in comparison with the corresponding values for the 1st example of the present invention.

|  | Example 1 | Sho 45-8840 |
| --- | --- | --- |
| $f_2$ | −25.270 | −21.281 |
| $f_{21}$ | −32.236 | −62.580 |
| $f_{22}$ | −44.603 | −52.502 |
| $f_{23}$ | −52.674 | −36.979 |
| $O_1$ | 0.084 | 4.60 |

It will be understood from the table that the example of the present invention has a far smaller value of the $O_1$. With so much large value as in the prior patent, the 1st and 2nd components no longer work without causing either the mechanical interference therebetween, or an unduly large increase in the diameter of the front member.

It can be reasoned out from this that the example of the present invention establishes a relationship: $|1/f_{21}| > |1/f_{22}| > |1/f_{23}|$, but the prior patent suffers from the entirely inverted relationship: $|1/f_{21}| < |1/f_{22}| < |1/f_{23}|$. Therefore, it is required that at least $|1/f_{21}|$ be larger than $|1/f_{22}|$ and $|1/f_{23}|$. This feature or condition is a rule of design for positioning the front principal point at or near the first surface of the 2nd component. And, from the ideal point of view it is desirable that the relationship $|1/f_{21}| > |1/f_{22}| > |1/f_{23}|$ is fulfilled. If so, besides the fulfillment of the requirement for the position of the front principal plane, this gives rise to an additional advantage that the oblique pencil of the largest angle for the wide angle setting undergoes a gradual refraction by the negative elements in the 2nd component, for this is a best means of avoiding the production of higher aberrations.

The 2nd and 3rd examples of the present invention have the following numerical values for $f_2$, $f_{21}$, $f_{22}$, $f_{23}$ and $O_1$.

|  | Example 2 | Example 3 |
| --- | --- | --- |
| $f_2$ | −25.245 | −25.275 |
| $f_{21}$ | −32.472 | −32.319 |
| $f_{22}$ | −44.985 | −43.246 |
| $f_{23}$ | −50.905 | −47.224 |

-continued-

| | Example 2 | Example 3 |
|---|---|---|
| $O_1$ | 0.0177 | −0.2993 |

The provision of the air lens of converging action in the spacing between the 3rd and 4th elements in the 2nd component also enables the spherical aberration to be very well corrected in the telephoto positions. This is very prominent in comparison to the case where the spacing is removed by the cementing. Further, to achieve the perfect correction of chromatic aberration, it is better to use a high dispersive glass in the negative element in the 1st component and the positive element in the 2nd component, and a low dispersive glass in the positive elements in the 1st component and the negative elements in the 2nd component.

The 3rd component because of its power being not so strong may be constructed with one singlet or doublet of negative power in the meniscus form of forward concavity, for as small an over-correction of spherical aberration as possible is resulted. Also with a view to the approaching of the diaphragm to the first surface thereof, it is preferred to minimize the axial thickness of the 3rd component.

The foregoing explanation has been given to the rules of design of the zoom portion. Next explanation is given to a relay lens portion (convergent 4th component). Since the zoom portion projects axial rays of considerably strong divergence, the back focal length of the 4th component is necessarily elongated. Therefore, it is required to lay a positive lens element of strong power at the front in the 4th component. This arrangement of the positive element, however, results in an under-correction of spherical aberration. Therefore, it is followed by a positive doublet having a diverging cemented surface concave toward the front so that the above-described spherical aberration is partly compensated for. In addition thereto, the refractive indices of the materials of which the doublet is made up are differentiated from each other to a considerably large extent to improve the Petzval sum. It is then followed by an air spacing within a range of preventing an unduly large increase in the diameter of the rear members, by negative, positive and positive elements, thereby the residual spherical aberration is perfectly compensated for, and further the distortion, astigmatism and coma are balanced out for high grade imaging performance throughout the zooming range.

As far as the convergent component-preceded four-component type of zoom lens is concerned, it may be said that the height of incidence of the oblique pencil at the largest angle on the first surface of the first component takes a largest value when zoomed to the wide angle setting or to a point somewhat away therefrom toward the telephoto setting. If it is possible to approach to the first surface the diaphragm which is generally to be positioned just in front of the relay lens, therefore, the height of incidence of the oblique pencil on the first surface can be reduced with a great advantage of shortening the diameter of the front member. On this account, in the examples of wide angle zoom lenses of the present invention, the diaphragm is made movable when zooming is performed. To facilitate this, according to the embodiments of the invention, the air spacing between the 3rd and 4th components when in the wide angle settings is held so large as to permit the approaching of the diaphragm and therefore to realize the above-described advantage. It should be pointed out that as the diaphragm approaches the first surface of the first component, whilst the diameter of the front member is shortened, the diameter of the rear member is conversely increased. However, since the wide angle zoom lens of the invention has the diverging light rays incident upon the 4th component, and therefore the back focal length is elongated with decrease in the diameter of the rear members, the approach of the diaphragm to the first surface does not lead to deteriorate the imaging performance due to the increase of the diameter of the rear member, provided that the amount of movement of the diaphragm to the first surface is not extremely large. To avoid the extremely large increase in the air spacing between the 3rd and 4th components when zoomed in the wide angle positions, therefore, it is desirable to employ a power distribution satisfying at least a condition: $f_1 > e − 2 f_2$ (where $f_1$ and $f_2$ represent the focal lengths of the 1st and 2nd components, and e the interval between the principal points of the 1st and 2nd components in the wide angle position). It is further noted that since the outer diameter of the 3rd component and the diameter of the diaphragm are far smaller than that of the front member, the means necessary to achieve the movement of the diaphragm along with the 3rd component can be incorporated in the control or cam mechanism for the 3rd component and calls for no increase in the outer diameter of a mechanical mounting for the zoom lens, though the internal structure is more or less complicated as compared with the conventional system.

Thus, according to the above-described features or rules of design, a compact wide angle zoom lens having an angular field of 61.7° in the wide angle setting with a range of variation of the focal length from 36.2 to 102 mm, or from 36.2 to 83 mm and a constant relative aperture of 1:3.5 while still being well corrected for high grade imaging performance is made realized as will be seen from the following examples of embodiments thereof.

Figures 2A, 2B, 2C, 2D:
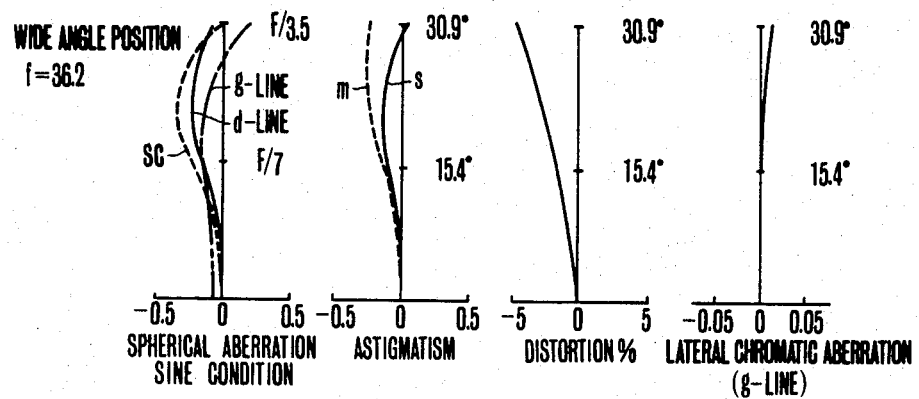
FIGS. 2, 3 and 4 are graphic representations of the various aberrations of the lens of FIG. 1 when in the wide angle, middle and telephoto positions with object at infinity.

Example 1 (FIGS. 1 and 2)

Focal Length f = 36.2−102  F-number = 1:3.5
Image Angle: 2ω = 61.7−24°

| Radius of Curvature | | Axial Thickness and Separation | | Refractive Index (Nd) | | Abbe Number |
|---|---|---|---|---|---|---|
| R1 | 118.603 | D1 | 2.8 | N1 | 1.80518 | ν1 | 25.4 |
| R2 | 46.402 | D2 | 6.97 | N2 | 1.65844 | ν2 | 50.9 |
| R3 | 127.02 | D3 | 0.1 | | | | |
| R4 | 71.531 | D4 | 4.24 | N3 | 1.6968 | ν3 | 55.5 |
| R5 | 189.422 | D5 | 0.1 | | | | |
| R6 | 46.371 | D6 | 6.26 | N4 | 1.6968 | ν4 | 55.5 |
| R7 | 173.027 | D7 | | | | | |
| R8 | 220.423 | D8 | 1.6 | N5 | 1.83481 | ν5 | 42.7 |
| R9 | 23.904 | D9 | 1.81 | | | | |
| R10 | 41.883 | D10 | 1.5 | N6 | 1.804 | ν6 | 46.6 |
| R11 | 19.011 | D11 | 4.6 | | | | |
| R12 | −189.831 | D12 | 1.3 | N7 | 1.6968 | ν7 | 55.5 |
| R13 | 45.629 | D13 | 0.39 | | | | |
| R14 | 28.39 | D14 | 4.04 | N8 | 1.84666 | ν8 | 23.9 |
| R15 | −6974.39 | D15 | | | | | |
| R16 | −34.387 | D16 | 1.4 | N9 | 1.6968 | ν9 | 55.5 |
| R17 | −91.235 | D17 | | | | | |
| R18 | 63.15 | D18 | 2.92 | N10 | 1.6968 | ν10 | 55.5 |
| R19 | −63.352 | D19 | 0.1 | | | | |
| R20 | 28.661 | D20 | 4.69 | N11 | 1.54072 | ν11 | 47.2 |
| R21 | −35.874 | D21 | 1.2 | N12 | 1.804 | ν12 | 46.6 |
| R22 | ∞ | D22 | 6.68 | | | | |
| R23 | −159.879 | D23 | 1.5 | N13 | 1.84666 | ν13 | 23.9 |
| R24 | 32.418 | D24 | 2.3 | | | | |
| R25 | −96.759 | D25 | 3.07 | N14 | 1.60311 | ν14 | 60.7 |

-continued

| | | | | | | | |
|---|---|---|---|---|---|---|---|
| R26 | −27.265 | D26 | 0.16 | | | | |
| R27 | 42.353 | D27 | 3.3 | N15 | 1.60311 | ν15 | 60.7 |
| R28 | 4211.79 | | | | | | |

| f | 36.2 | 70 | 102 |
|---|---|---|---|
| D7 | 1.444 | 17.051 | 23.459 |
| D15 | 16.612 | 3.009 | 2.924 |
| D17 | 10.4 | 8.4 | 2.073 |

$f_{1-3} = -19.88 f_w$ where $f_{1-3}$ is the focal length of the cemented lens in the 1st component; and $f_w$ is the shortest focal length of the entire lens system.

Figures 3A, 3B, 3C, 3D:
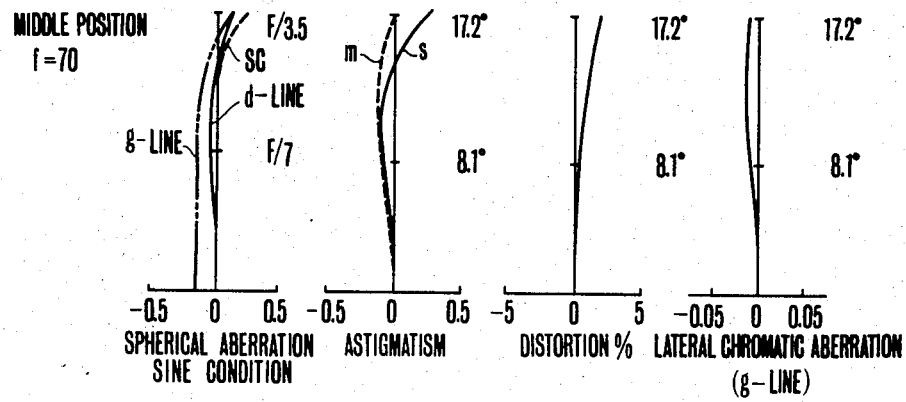
Figures 4A, 4B, 4C, 4D:
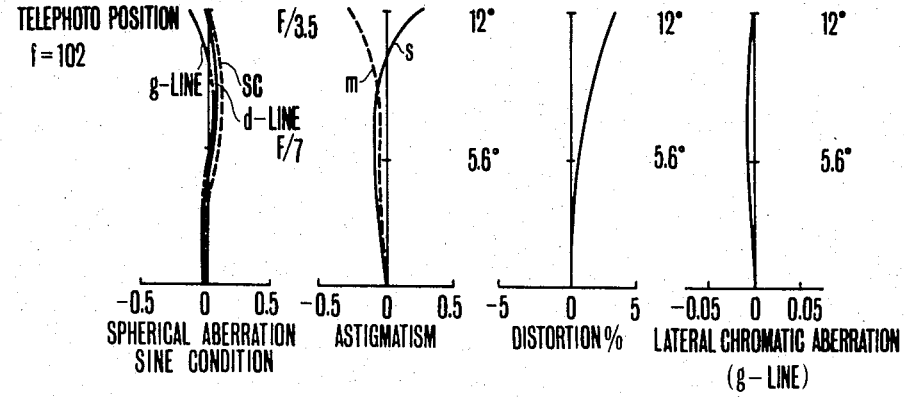

Example 2 (FIGS. 3 and 4)
Focal Length f = 36.2-102     F/3.5
Image Angle 2ω = 61.7-24°

| | Radius of Curvature | | Axial Thickness and Separation | | Refractive Index (Nd) | | Abbe Number |
|---|---|---|---|---|---|---|---|
| R1 | 108. | D1 | 2.8 | N1 | 1.80518 | ν1 | 25.4 |
| R2 | 46.403 | D2 | 7.23 | N2 | 1.6583 | ν2 | 57.3 |
| R3 | 147.55 | D3 | 0.1 | | | | |
| R4 | 73.34 | D4 | 3.79 | N3 | 1.6968 | ν3 | 55.5 |
| R5 | 144.346 | D5 | 0.1 | | | | |
| R6 | 47.137 | D6 | 6.63 | N4 | 1.6968 | ν4 | 55.5 |
| R7 | 185.394 | D7 | | | | | |
| R8 | 213.199 | D8 | 1.6 | N5 | 1.841 | ν5 | 43.2 |
| R9 | 24.125 | D9 | 1.66 | | | | |
| R10 | 40.167 | D10 | 1.5 | N6 | 1.816 | ν6 | 46.6 |
| R11 | 18.858 | D11 | 4.99 | | | | |
| R12 | −200.536 | D12 | 1.3 | N7 | 1.6968 | ν7 | 55.5 |
| R13 | 43.208 | D13 | 0.46 | | | | |
| R14 | 28.244 | D14 | 3.71 | N8 | 1.84666 | ν8 | 23.9 |
| R15 | ∞ | D15 | | | | | |
| R16 | −37.304 | D16 | 0.7 | N9 | 1.6968 | ν9 | 55.5 |
| R17 | ∞ | D17 | 1.8 | N10 | 1.70154 | ν10 | 41.1 |
| R18 | −116.625 | D18 | | | | | |
| R19 | 64.379 | D19 | 4.27 | N11 | 1.6968 | ν11 | 55.5 |
| R20 | −64.72 | D20 | 0.1 | | | | |
| R21 | 28.44 | D21 | 4.52 | N12 | 1.54041 | ν12 | 51 |
| R22 | −35.429 | D22 | 1.2 | N13 | 1.804 | ν13 | 46.6 |
| R23 | 9327.53 | D23 | 6.15 | | | | |
| R24 | −211.726 | D24 | 2.39 | N14 | 1.84666 | ν14 | 23.9 |
| R25 | 32.627 | D25 | 2.3 | | | | |
| R26 | −115.863 | D26 | 3.03 | N15 | 1.60311 | ν15 | 60.7 |
| R27 | −28.236 | D27 | 0.91 | | | | |
| R28 | 44.178 | D28 | 3.3 | N16 | 1.60311 | ν16 | 60.7 |
| R29 | 569.706 | | | | | | |

| f | 36.2 | 70 | 102 |
|---|---|---|---|
| D7 | 0.996 | 16.603 | 23.012 |
| D15 | 16.53 | 2.926 | 2.841 |
| D18 | 10.2 | 8.197 | 1.873 |

$f_{1-3} = \infty$

Figure 5:
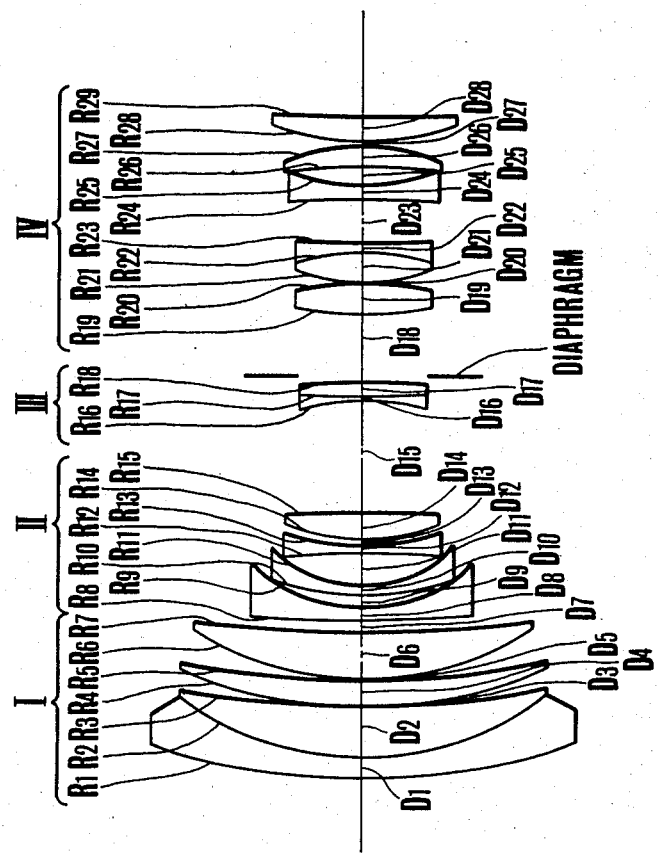
FIG. 5 is a lens block diagram corresponding to Example 2.

Example 3 (FIGS. 5 and 6)
Focal Length f = 36.2-83     F/3.5
Image Angle 2ω = 61.7-29.2°

| | Radius of Curvature | | Axial Thickness and Separation | | Refractive Index (Nd) | | Abbe Number |
|---|---|---|---|---|---|---|---|
| R1 | 103. | D1 | 2.4 | N1 | 1.80518 | ν1 | 25.4 |
| R2 | 46.4 | D2 | 7.6 | N2 | 1.67 | ν2 | 57.4 |
| R3 | 147.55 | D3 | 0.1 | | | | |
| R4 | 68.074 | D4 | 3.29 | N3 | 1.6968 | ν3 | 55.5 |
| R5 | 125.906 | D5 | 0.1 | | | | |
| R6 | 48.462 | D6 | 6.62 | N4 | 1.6968 | ν4 | 55.5 |
| R7 | 176.447 | D7 | | | | | |
| R8 | 190.154 | D8 | 1.6 | N5 | 1.83481 | ν5 | 42.7 |
| R9 | 23.537 | D9 | 1.71 | | | | |
| R10 | 41.016 | D10 | 1.5 | N6 | 1.804 | ν6 | 46.6 |
| R11 | 18.511 | D11 | 4.29 | | | | |
| R12 | −116.602 | D12 | 1.3 | N7 | 1.6968 | ν7 | 55.5 |
| R13 | 46.053 | D13 | 0.82 | | | | |
| R14 | 29.231 | D14 | 4.13 | N8 | 1.84666 | ν8 | 23.9 |
| R15 | −332.559 | D15 | | | | | |
| R16 | −32.325 | D16 | 1.4 | N9 | 1.6968 | ν9 | 55.5 |
| R17 | −78.297 | D17 | | | | | |
| R18 | 66.059 | D18 | 3.09 | N10 | 1.6968 | ν10 | 55.5 |
| R19 | −71.556 | D19 | 0.1 | | | | |
| R20 | 28.242 | D20 | 4.85 | N11 | 1.53358 | ν11 | 51.6 |
| R21 | −35.003 | D21 | 1.2 | N12 | 1.804 | ν12 | 46.6 |
| R22 | 3895.7 | D22 | 6.17 | | | | |
| R23 | −209.864 | D23 | 1.5 | N13 | 1.84666 | ν13 | 23.9 |
| R24 | 32.517 | D24 | 1.93 | | | | |
| R25 | −71.313 | D25 | 2.81 | N14 | 1.618 | ν14 | 63.4 |
| R26 | −26.887 | D26 | 0.16 | | | | |
| R27 | 441.407 | D27 | 3.44 | N15 | 1.618 | ν15 | 63.4 |
| R28 | −135.948 | | | | | | |

| f | 36.2 | 55 | 83 |
|---|---|---|---|
| D7 | 1.125 | 11.686 | 19.856 |
| D15 | 15.907 | 5.462 | 1.514 |
| D17 | 6.4 | 6.284 | 2.062 |

$f_{1-3} = 50.92 \cdot f_w$

What is claimed is:

1. A wide angle zoom lens comprising:
   a first lens group of a positive refractive power stationary during zooming but movable for focusing and consisting of four elements forming three members, said members being from front to rear, a cemented lens and two positive lenses, each of said three members being in the meniscus form of convex curvature toward the front, and said cemented lens being almost afocal with its cemented surface being divergent and convex toward the front;
   a second lens group of a negative refractive power movable for changing the magnification and consisting of four elements, said members being from front to rear, two negative meniscus lenses of forward convexity, a bi-concave negative lens and a positive lens, said bi-concave negative lens and said positive lens defining an air spacing having a converging action;
   a third lens group movable for maintaining a constant image plane as said second group moves to effect a change in magnification; and
   a fourth lens group positioned in the rear of said third group to be stationary during zooming; wherein $|1/f_{21}| > |1/f_{22}|$ $|1/f_{21}| > |1/f_{23}|$ where $f_{21}$, $f_{22}$ and $f_{23}$ are the focal lengths of the first, second and third negative lenses counting from the front respectively in said second group.

2. A wide angle zoom lens comprising:
   a first lens group of a positive refractive power stationary during zooming but movable for focusing and consisting of four elements forming three members, said members being from front to rear, a cemented lens and two positive lenses, each of said three members being in the meniscus form of convex curvature toward the front, and said cemented lens being almost afocal with its cemented surface being divergent and convex toward the front;
   a second lens group of a negative refractive power movable for changing the magnification and consisting of four elements, said members being from front to rear, two negative meniscus lenses of forward convexity, a bi-concave negative lens and a positive lens, said bi-concave negative lens and said positive lens defining an air spacing having a converging action;

a third lens group movable for maintaining a constant image plane as said second group moves to effect a change in magnification; and a fourth lens group positioned in the rear of said third group to be stationary during zooming;

said third lens group having a negative refractive power and being in the form of a negative meniscus lens of concave curvature toward the front, said fourth lens group having a positive refractive power and consisting of, from front to rear, a positive lens, a cemented lens having a surface concave toward the front with its front surface of strong curvature, a negative lens with its rear surface of strong curvature, a positive meniscus lens of convex curvature toward the rear, and a positive lens.

3. A wide angle zoom lens according to claim 2, wherein said third lens group or negative lens consists of a negative cemented meniscus lens of concave curvature toward the front.

4. A wide angle zoom lens according to claim 1, fulfilling the following relationship:

$$|1/f_{21}| > |1/f_{22}| > |1/f_{23}|$$

5. A wide angle zoom lens comprising:

a first group having a positive refractive power, fixed during zooming and movable for focusing;

a second group having a negative refractive power and movable for magnification change, said second group consisting of, from front to rear, two negative lenses with convex surfaces directed toward the object, a negative bi-concave lens and a positive lens, said first three negative lenses satisfying the relation $$|1/f_{21}| > |1/f_{22}| > |1/f_{23}|$$

in which $f_{21}$, $f_{22}$ and $f_{23}$ respectively are the focal distance of each of the three negative lenses;

a third group movable for maintaining an image plane at a constant position when the second group moves for magnification change; and a fourth group positioned behind the third group and fixed during zooming;

said bi-concave lens and said positive lens forming an air space of a converging nature.

* * * * *